US011167418B2

(12) United States Patent
Yoshizawa

(10) Patent No.: US 11,167,418 B2
(45) Date of Patent: Nov. 9, 2021

(54) OPERATION PLANNING APPARATUS AND OPERATION PLANNING METHOD

(71) Applicant: Toyota Jidosha Kabushiki Kaisha, Toyota (JP)

(72) Inventor: Shintaro Yoshizawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 230 days.

(21) Appl. No.: 16/433,299

(22) Filed: Jun. 6, 2019

(65) Prior Publication Data

US 2019/0375100 A1 Dec. 12, 2019

(30) Foreign Application Priority Data

Jun. 8, 2018 (JP) .............................. JP2018-110248

(51) Int. Cl.
 *B25J 9/16* (2006.01)
(52) U.S. Cl.
 CPC .......... *B25J 9/1664* (2013.01); *B25J 9/1661* (2013.01); *B25J 9/1666* (2013.01)
(58) Field of Classification Search
 CPC . B25J 9/1664; B25J 9/1661; B25J 9/16; B25J 9/1666; B25J 9/1651
 See application file for complete search history.

(56) References Cited

U.S. PATENT DOCUMENTS

| 9,821,458 | B1 * | 11/2017 | Watts | B25J 9/163 |
|---|---|---|---|---|
| 2009/0037021 | A1 * | 2/2009 | Sladek | B25J 9/1664 700/245 |
| 2018/0233397 | A1 * | 8/2018 | Hosek | B25J 9/0084 |

FOREIGN PATENT DOCUMENTS

| JP | 2005309990 A | * | 11/2005 |
|---|---|---|---|
| JP | 2009-053926 A | | 3/2009 |
| JP | 2018-069428 A | | 5/2018 |

OTHER PUBLICATIONS

Lavalle, Steven M. et al., "Randomized kinodynamic planning", The International Journal of Robotics Research (IJRR), May 2001, p. 378-400, vol. 20 No. 5.
Hirano, Yutaka et al., "Image-based object recognition and dexterous hand/arm motion planning using RRTs for grasping in cluttered scene", IROS2005, Sep. 2005.

\* cited by examiner

*Primary Examiner* — Abby Y Lin
*Assistant Examiner* — Dylan M Katz
(74) *Attorney, Agent, or Firm* — Dinsmore & Shohl LLP

(57) ABSTRACT

An operation planning apparatus 1 of a robot 100 includes a non-interference path generation unit 3 and a time determination unit 5 configured to generate a time-space path. The time determination unit 5 includes a temporary time setting unit 8 configured to set, for each main point, temporary time in such a way that an operation speed does not exceed a maximum allowable speed between the plurality of main points; and a temporary time adjustment unit 9 configured to spatially smooth the spatial smoothing path in a first smoothing range that includes the main point using a mollifier function, and prolong, if the operation speed exceeds the maximum allowable acceleration in the first smoothing range, the temporary time of the plurality of main points after the main point in such a way that the operation speed does not exceed the maximum allowable acceleration in the first, smoothing range.

6 Claims, 12 Drawing Sheets

OPERATION PLANNING APPARATUS AND OPERATION PLANNING METHOD

CROSS REFERENCE TO RELATED APPLICATIONS

This application is based upon and claims the benefit of priority from Japanese patent application No. 2018-110248, filed on Jun. 8, 2018, the disclosure of which is incorporated herein in its entirety by reference.

BACKGROUND

The present disclosure relates to an operation planning apparatus of a robot and an operation planning method of a robot.

Patent Literature 1 (Japanese Unexamined Patent Application Publication No. 2018-069428) discloses an operation path planning method for planning an operation path of a robot. Specifically, a plurality of nodes are set in such a way that the robot does not interfere with an obstacle on a path between a start point and an end point and main points are set between the nodes that are adjacent to each other, and a composite product of the section of two main points adjacent to each other and a predetermined function is calculated, whereby a path of a smoothing function with respect to this section is calculated.

SUMMARY

Patent Literature 1 does not specifically disclose the way to satisfy conditions regarding a maximum allowable speed and a maximum allowable acceleration when the robot is operated.

An object of the present disclosure is to provide a technique for planning an operation of a robot in which conditions regarding a maximum allowable speed and a maximum allowable acceleration are satisfied without interference with an obstacle.

A first aspect of the present disclosure provides an operation planning apparatus of a robot, the apparatus including: a non-interference path generation unit configured to generate a non-interference path in which the robot does not interfere with an obstacle between a start point and an end point set in advance; a spatial smoothing path generation unit configured to generate a spatial smoothing path in which the non-interference path is spatially smoothed; and a time determination unit configured to determine time at which a plurality of main points included in the spatial smoothing path are passed, thereby generating a time-space path, which is a path in time-space, in which the plurality of main points include a start point of the spatial smoothing path, an end point of the spatial smoothing path, and a midpoint between the start point of the spatial smoothing path and the end point of the spatial smoothing path, and the time determination unit includes: a temporary time setting unit configured to set, for each main point, temporary time, which is time that elapses from the start point to each of the main points, in such a way that an operation speed does not exceed a maximum allowable speed between the plurality of main points; and a temporary time adjustment unit configured to spatially smooth the spatial smoothing path in a first smoothing range that includes the main point using a mollifier function, and prolong, if the operation speed exceeds a maximum allowable acceleration in the first smoothing range, the temporary time of the plurality of main points after the main point in such a way that the operation speed does not exceed the maximum allowable acceleration in the first smoothing range. According to the aforementioned configuration, an operation plan of the robot in which the conditions regarding the maximum allowable speed and the maximum allowable acceleration are satisfied can be obtained by a simple calculation without interference with the obstacle.

The temporary time adjustment unit may spatially smooth, when a result of spatially smoothing the spatial smoothing path using the mollifier function in the first smoothing range shows that the spatial smoothing path interferes with the obstacle, the spatial smoothing path using the mollifier function in a second smoothing range, which is a range that includes the main point and is narrower than the first smoothing range. According to the aforementioned configuration, it is possible to prevent the interference between the spatial smoothing path and the obstacle.

The temporary time adjustment unit may prolong, when a result of spatially smoothing the spatial smoothing path using the mollifier function in the second smoothing range shows that the operation speed exceeds the maximum allowable acceleration in the second smoothing range, the temporary time of the plurality of main points after the main point again in such a way that the operation speed does not exceed the maximum allowable acceleration in the second smoothing range. According to the aforementioned configuration, an operation plan of the robot in which the conditions regarding the maximum allowable speed and the maximum allowable acceleration are satisfied can be obtained definitely by a simple calculation without interference with the obstacle.

The midpoint may be a passing point of passing points on the spatial smoothing path at which an inclination with respect to the distance of the spatial smoothing path has been changed by a predetermined amount or more before and after the passing point.

The robot may be an articulated robot that includes a plurality of joints, and the temporary time is synchronized between the plurality of joints.

A second aspect of the present disclosure provides an operation planning method of a robot, the method including: a non-interference path generation step for generating a non-interference path in which the robot does not interfere with an obstacle between a start point and an end point set in advance; a spatial smoothing path generation step for generating a spatial smoothing path in which the non-interference path is spatially smoothed; and a time determination step for determining time at which a plurality of main points included in the spatial smoothing path are passed, thereby generating a time-space path, which is a path in time-space, in which the plurality of main points include a start point of the spatial smoothing path, an end point of the spatial smoothing path, and a midpoint between the start point of the spatial smoothing path and the end point of the spatial smoothing path, and the time determination step includes: a temporary time setting step for setting, for each main point, temporary time, which is time that elapses from the start point to each of the main points, in such a way that an operation speed does not exceed a maximum allowable speed between the plurality of main points; and a temporary time adjustment step for spatially smoothing the spatial smoothing path in a first smoothing range that includes the main point using a mollifier function, and prolonging, if the operation speed exceeds a maximum allowable acceleration in the first smoothing range, the temporary time of the plurality of main points after the main point in such a way that the operation speed does not exceed the maximum allowable acceleration in the first smoothing range. According to the aforementioned method, an operation plan of the robot in which the conditions regarding the maximum allowable speed and the maximum allowable acceleration are satisfied can be obtained by a simple calculation without interference with the obstacle.

According to the present disclosure, the operation plan of the robot in which the conditions regarding the maximum allowable speed and the maximum allowable acceleration are satisfied can be obtained by a simple calculation without interference with the obstacle.

The above and other objects, features and advantages of the present disclosure will become more fully understood from the detailed description given hereinbelow and the accompanying drawings which are given by way of illustration only, and thus are not to be considered as limiting the present disclosure.

DETAILED DESCRIPTION

Hereinafter, with reference to the drawings, embodiments of the present disclosure will be explained.

An operation planning apparatus according to one embodiment of the present disclosure generates, for a moving body that includes a manipulator, a trajectory such as a moving trajectory or a trajectory of the manipulator in time-space at a low operational cost, the trajectory being smooth spatially and temporally as well since constraint conditions such as speed, acceleration, jerk and the like are satisfied, and therefore a high operation efficiency is obtained. It can be expected that the robot that operates in accordance with the trajectory in time-space will be friendly to a person who is in the vicinity of the robot. Further, since vibration in this robot decreases, another effect that, for example, a liquid in a cup is not likely to be spilt can be expected.

Figure 1:
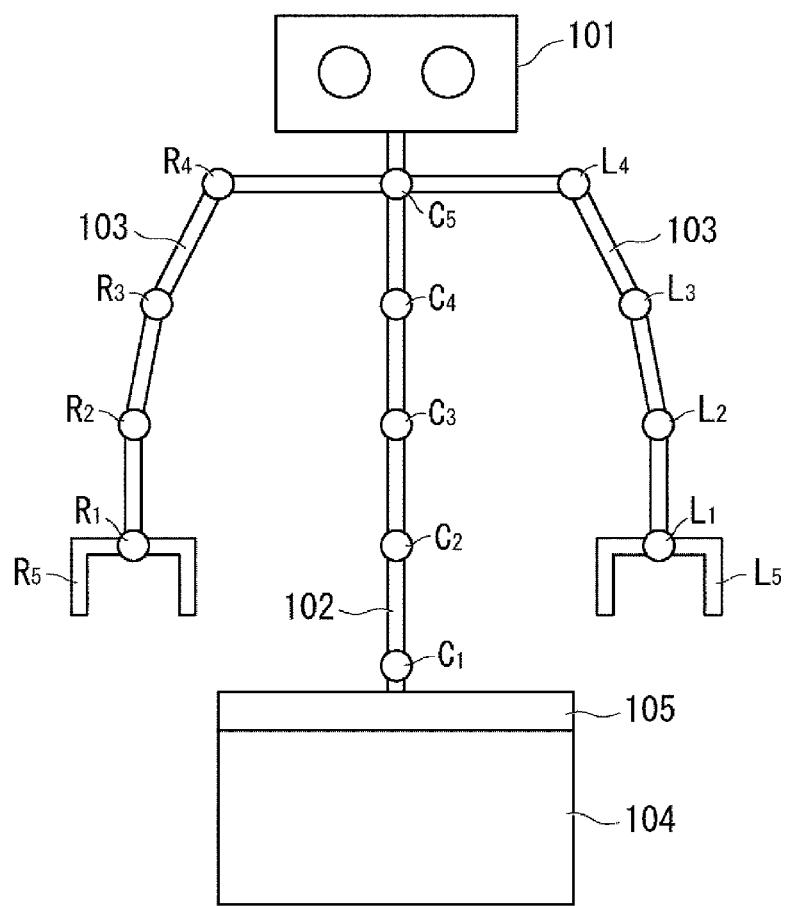
FIG. 1 is a diagram showing a schematic configuration of a robot according to one embodiment of the present disclosure.

FIG. 1 is a diagram showing a schematic configuration of a robot 100 according to one embodiment of the present disclosure. The robot 100 is, for example, a humanoid robot, and includes a head part 101, a body part 102, a pair of arm parts 103 (manipulators), a movement mechanism 104, and a control apparatus 105.

A camera and a depth sensor are mounted on the head part 101. The robot 100 is therefore able to detect an obstacle which is in the vicinity of the robot 100.

The body part 102 is provided with a plurality of joint parts $C_1$-$C_5$. The arm parts 103 include a plurality of joint parts $R_1$-$R_4$ and $L_1$-$L_4$ and hands $R_5$ and $L_5$. Each of the joint parts $R_1$-$R_4$ and $L_1$-$L_4$ is provided with an actuator such as a servomotor that rotates or slides each of the joint parts $R_1$-$R_4$ and $L_1$-$L_4$. Each of the joint parts $R_1$-$R_4$ and $L_1$-$L_4$ is provided with a sensor that detects the rotation or the slide of each of the joint parts $R_1$-$R_4$ and $L_1$-$L_4$.

The movement mechanism 104, which includes wheels or a leg part, drives the wheels or the leg part to move the robot 100.

The control apparatus 105 controls the actuators of the respective joint parts $R_1$-$R_4$ and $L_1$-$L_4$ and the movement mechanism 104. The control apparatus 105 includes an operation planning apparatus 1 shown in FIG. 2.

Figure 2:
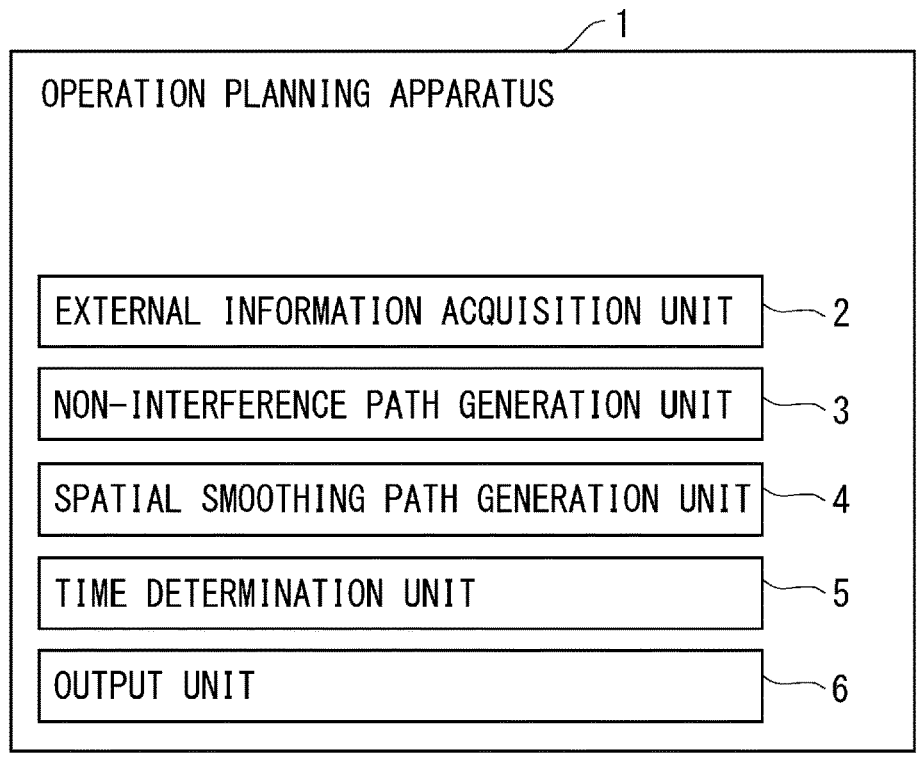
FIG. 2 is a block diagram showing a schematic system configuration of an operation planning apparatus according to one embodiment of the present disclosure.

The operation planning apparatus 1 shown in FIG. 2 plans an operation path in time-space of joint vectors of the respective joint parts $R_1$-$R_4$ and $L_1$-$L_4$ indicating the positions of the respective joint parts $R_1$-$R_4$ and $L_1$-$L_4$ of the robot 100.

FIG. 2 is a block diagram showing a schematic system configuration of the operation planning apparatus 1 according to this embodiment. The operation planning apparatus 1 according to this embodiment includes an external information acquisition unit 2, a non-interference path generation unit 3, a spatial smoothing path generation unit 4, a time determination unit 5, and an output unit 6.

The operation planning apparatus 1 includes, for example, a CPU, a RAM, and a ROM. The CPU loads a control program recorded in the ROM and executes the loaded program thereon, whereby the control program causes hardware such as the CPU to function as the external information acquisition unit 2, the non-interference path generation unit 3, the spatial smoothing path generation unit 4, the time determination unit 5, and the output unit 6. Alternatively, the external information acquisition unit 2, the non-interference path generation unit 3, the spatial smoothing path generation unit 4, the time determination unit 5, and the output unit 6 may be achieved by hardware.

The external information acquisition unit 2 acquires external information such as the position, the shape or the like of the obstacle in the environment using the camera and the depth sensor of the head part 101. The external information acquired by the external information acquisition unit 2 is stored in a memory or the like as environmental map information.

The non-interference path generation unit 3 generates a spatial non-interference operation path of the robot main body and the joint parts $R_1$-$R_4$ and $L_1$-$L_4$ in which the robot 100 does not interfere with the obstacle in the environmental map information based on, for example, a start point and an end point that have been set in advance and the environmental map information stored in the memory. The non-interference path generation unit 3 generates the operation path using a stochastic search method capable of searching an operation path even in an environment in which, for example, many obstacles are placed in disorder. The non-interference operation path generated by the non-interference path generation unit 3 is a zig-zag operation path.

The details of the stochastic search method are disclosed, for example, in Non-Patent Literature: LaValle Steven M, Kuffner Jr. James J. (2001). "Randomized kinodynamic planning". The International Journal of Robotics Research (IJRR)20(5)., which can be incorporated herein by reference. Further, the aforementioned method of generating the operation path is merely an example and is not limited thereto.

The spatial smoothing path generation unit 4 spatially smooths a zig-zag non-interference operation path generated by the non-interference path generation unit 3 to obtain a spatial smoothing path. To "smooth" here means to change the non-interference operation path set as described above to a spatially smooth curve. It is demonstrated whether the spatial smoothing path interferes with the obstacle when smoothing is executed. When the spatial smoothing path interferes with the obstacle, smoothing is executed repeatedly until this interference is avoided.

The spatial smoothing path generation unit 4 calculates, for example, a composite product of the zig-zag non-interference operation path generated by the non-interference path generation unit 3 and a mollifier function (predetermined function) of a polynomial, thereby smoothing the non-interference operation path.

The aforementioned mollifier function is, for example, a Ternary Polynomial function. The ternary polynomial function is a polynomial function that has three regions of a function value increasing region, constant region, and decreasing region. The increasing region and the decreasing region are symmetrical with the constant region interposed therebetween. Details of the ternary polynomial are disclosed in Japanese Unexamined Patent Application Publication No. 2009-053926 already filed by the applicant of the present disclosure and shall be incorporated herein by reference.

The mollifier function T(x) can be expressed, for example, by the following expression (1).

$$T_{i+1}(x) = \int_{-\infty}^{x} \left( T_i\left(y + \frac{a_{i+1} - a_i}{2}\right) + T_i\left(y - \frac{a_{i+1} - a_i}{2}\right) \right) dy \quad \text{[Formula 1]}$$

In the aforementioned expression (1), $T_0(x)$ of an order 0 is $T_0(x)=C(-a_0/2<x<a_0/2)$ and $T_0(x)=0(x\leq-a_0/2, x\geq a_0/2)$. The symbols C and $a_0$ are constants. The symbol i is 0 or a positive integer.

Next, a method of calculating a composite product of the non-interference operation path and the mollifier function of the polynomial will be described in detail. The spatial smoothing path generation unit 4 calculates the composite product $f_d(x)$ using the following expression (2) based on the non-interference operation path f(y) generated by the non-interference path generation unit 3 and the aforementioned mollifier function $T_n(x)$ of the polynomial, thereby generating the spatial smoothing path.

$$f_d(x)=\Sigma_{-\infty}^{\infty}(x-y)f(y)dy \quad \text{[Formula 2]}$$

The mollifier function $T_n(x)$ is a function that can be differentiated n-1 times, and has parameters $a_0, a_1, \ldots, a_n$, and C. Here, d is defined to be $d=(a_0, a_1, \ldots, a_n, C)$. Further, C is adjusted in such a way that an integrated value of the mollifier function becomes 1. Further, $f_d(x)$ is a function can be differentiated n-1 times, and uniformly converges to $f_d \rightarrow f$.

The time determination unit 5 determines time at which a plurality of main points included in the spatial smoothing path are passed, thereby generating the time-space path, which is a path in time-space.

The output unit 6 outputs the time-space path generated by the time determination unit 5. The output unit 6 synchronizes, for example, time of each joint for each component of the joint vector of the robot 100, and outputs graph data that indicates a relation among the joint angle, the joint angular velocity, the joint angular acceleration, the joint jerk, and the time.

Figure 3:
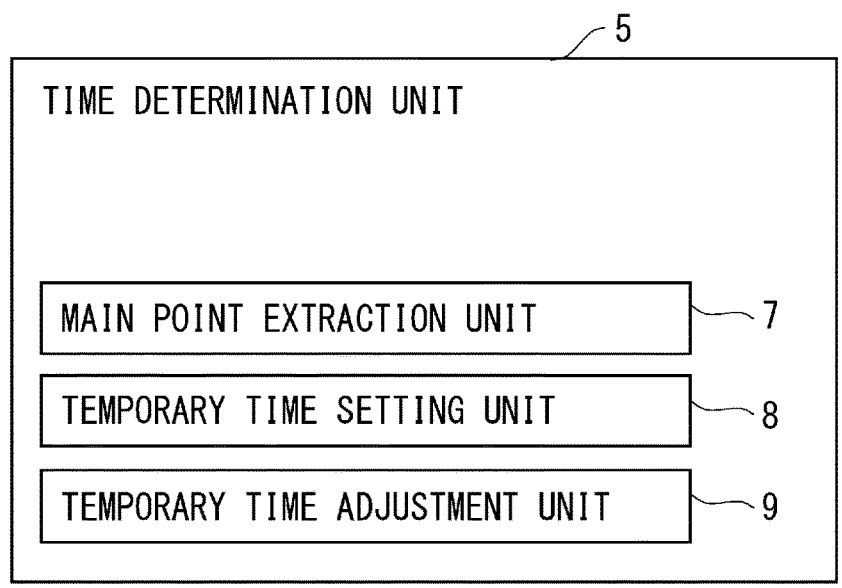
FIG. 3 is a block diagram showing a schematic system configuration of a time determination unit according to one embodiment of the present disclosure.

With reference next to FIG. 3, the time determination unit 5 will be explained.

As shown in FIG. 3, the time determination unit 5 includes a main point extraction unit 7, a temporary time setting unit 8, and a temporary time adjustment unit 9. The main point extraction unit 7, the temporary time setting unit 8, and the temporary time adjustment unit 9 may be achieved either by software as described above or by hardware.

The main point extraction unit 7 acquires the spatial smoothing path from the spatial smoothing path generation unit 4 and extracts a main joint vector sequence (main point) from a plurality of joint vector sequences that compose the spatial smoothing path. The spatial smoothing path is composed of a plurality of joint vector sequences determined for each distance from the start point.

Figure 4:
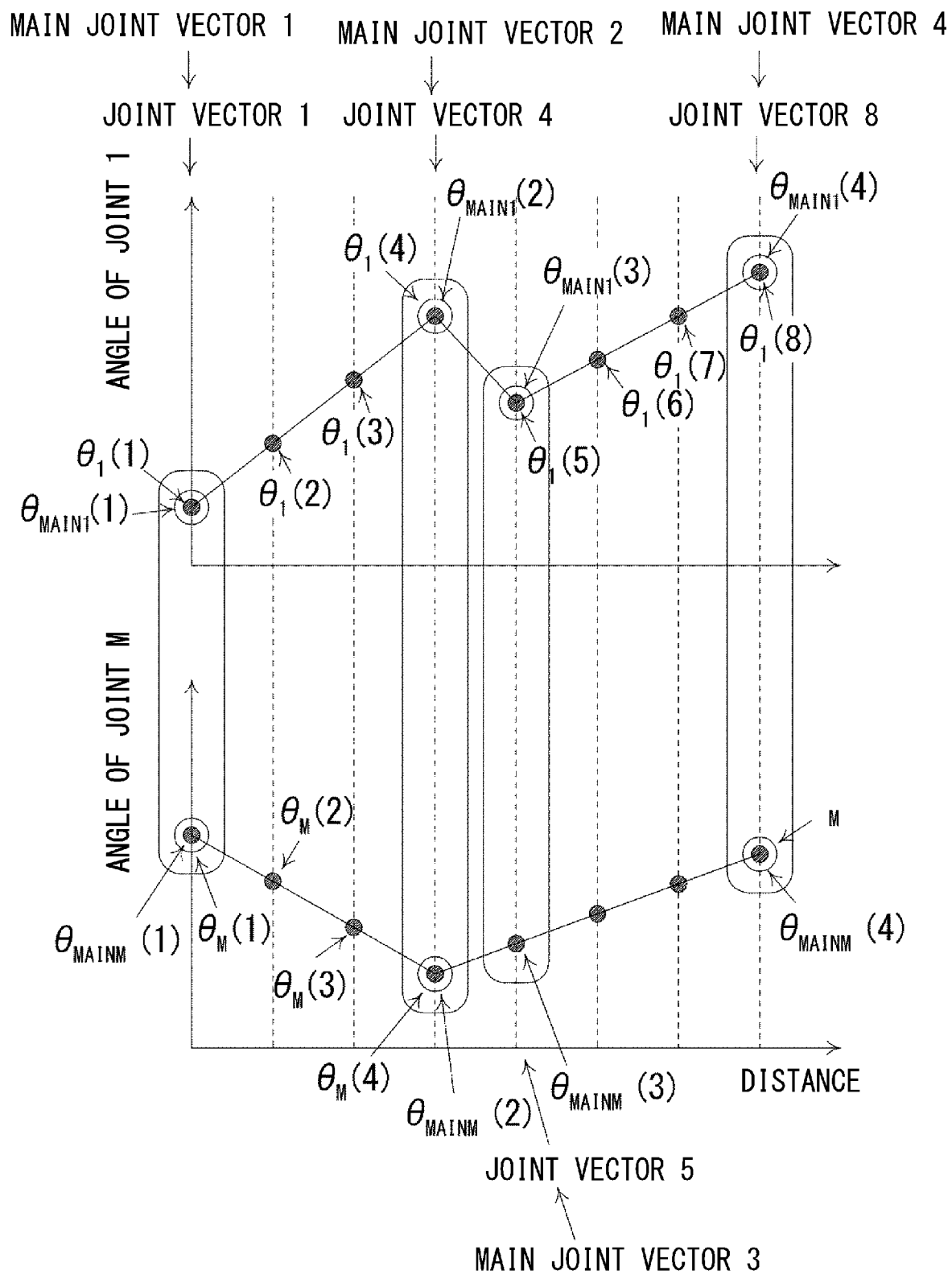
FIG. 4 is a diagram showing a graph indicating joint angles of joint parts of the robot and a distance of joint vectors.

As shown in FIG. 4, the plurality of joint vector sequences include a joint vector 1, which is the joint vector at the start point, and a joint vector 8, which is the joint vector at the end point. Further, the plurality of joint vector sequences include a plurality of joint vectors 2, 3, 4, . . . , 7 between the joint vector 1 and the joint vector 8. The number of joint vectors included in the spatial smoothing path is not limited to 8. The plurality of joint vector sequences have, for example, the data structure as shown below. Here, M represents the total number of joints.

Joint vector 1=(joint 1 angle 1, joint 2 angle 1, . . . , joint M angle 1)
Joint vector 2=(joint 1 angle 2, joint 2 angle 2, . . . , joint M angle 2)
Joint vector 3=(joint 1 angle 3, joint 2 angle 3, . . . , joint M angle 3)
. . .
Joint vector 8=(joint 1 angle 8, joint 2 angle 8, . . . , joint M angle 8)

Note that "joint a angle b" means the angle of the a-th joint in the b-th joint vector on the distance axis.

Further, the main point extraction unit 7 externally acquires a start point condition and an end point condition. The start point condition is composed of the following joint vector 1 and joint velocity vector 1. The end point condition is composed of the following joint vector 8 and joint velocity vector 8.

Joint vector 1=(joint 1 angle 1, joint 2 angle 1, . . . , joint M angle 1)
Joint velocity vector 1=(joint 1 angular velocity 1, joint 2 angular velocity 1, . . . , joint M angular velocity 1)
Joint vector 8=(joint 1 angle 8, joint 2 angle 8, . . . , joint M angle 8)
Joint velocity vector 8=(joint 1 angular velocity 8, joint 2 angular velocity 8, . . . , joint M angular velocity 8)

With reference next to FIG. 4, the main joint vector sequence will be explained. FIG. 4 shows the plurality of joint vectors 1, 2, ..., 8 that compose the spatial smoothing path. The horizontal axis indicates the distance and the vertical axis indicates the angle in each joint. As shown in FIG. 4, the angle of each joint increases or decreases in accordance with the moved distance. FIG. 4 illustrates the transition of the angle of the first joint and the transition of the angle of the M-th joint. As shown in FIG. 4, in the spatial smoothing path as well, transition of the angle of each joint is not completely smoothed. That is, the angle of each joint in the spatial smoothing path makes a transition in a zigzag pattern.

In the following description, as shown in FIG. 4, the d-th joint angle in the joint vector c will be denoted by an angle $\theta_d(c)$.

As shown in FIG. 4, the angle of the first joint is changed in a folded manner before and after the joint vector 4. In other words, the inclination of the line segment that connects the angle $\theta_1(3)$ and the angle $\theta_1(4)$ greatly varies from the inclination of the line segment that connects the angle $\theta_1(4)$ and the angle $\theta_1(5)$. In this way, when the inclination with respect to the distance of the angle of the joint is changed by a predetermined value or more before and after one joint vector, this joint vector is referred to as a main joint vector. Then a group of a plurality of joint vectors is defined to be a main joint vector sequence. Further, plots of the spatial smoothing path included in the main joint vector are denoted by main points. Therefore, the plot indicated by the angle $\theta_1(4)$ is a main point. In a similar way, the plot indicated by the angle $\theta_1(5)$ is a main point. The plot indicated by the angle $\theta_M(4)$ is a main point since the inclination is changed by a predetermined value or more before and after the joint vector. The plot indicated by the angle $\theta_M(5)$ is also a main point since the corresponding angle $\theta_1(5)$ on the distance axis is a main point. Further, the plots in the start point (joint vector 1) and the end point (joint vector 8) are regarded as the main points. Therefore, the angle $\theta_1(1)$ and the angle $\theta_M(1)$, the angle $\theta_1(8)$ and the angle $\theta_M(8)$ are the main points.

The joint vectors 1, 4, 5, and 8 are main joint vectors. Therefore, in the following description, the joint vector 1 is denoted by a main joint vector 1, the joint vector 4 is denoted by a main joint vector 2, the joint vector 5 is denoted by a main joint vector 3, and the joint vector 8 is denoted by a main joint vector 4. Further, the angle of the f-th joint in the main joint vector e is denoted by an angle $\theta_{MAINf}(e)$. The subsequent processing is performed only on the main points included in the main joint vectors 1-4.

The temporary time setting unit 8 sets, for each main point, the temporary time P(N), which is time that elapses from the start point to each of the main points in such a way that the operation speed does not exceed the maximum allowable speed between the plurality of main points. Specifically, the temporary time P(N) can be obtained from the following expression (3).

[Formula2]
$$P(N) = \sum_{n=1}^{N-1} \max\left(\left|\frac{\theta_{MAIN1}(n+1) - \theta_{MAIN1}(n)}{v\max_1}\right|, \left|\frac{\theta_{MAIN2}(n+1) - \theta_{MAIN2}(n)}{v\max_2}\right| \cdots \left|\frac{\theta_{MAINM}(n+1) - \theta_{MAINM}(n)}{v\max_M}\right|\right)$$

The symbol M is the total number of joints, N is the number of the main joint vector, and $v\max_m$ is the maximum allowable speed in the joint m.

Accordingly, the temporary time P(2) of the main joint vector 2 can be obtained by the following expression (4).

[Formula3]
$$P(2) = \max\left(\left|\frac{\theta_{MAIN1}(2) - \theta_{MAIN1}(1)}{v\max_1}\right|, \left|\frac{\theta_{MAIN2}(2) - \theta_{MAIN2}(1)}{v\max_2}\right| \cdots \left|\frac{\theta_{MAINM}(2) - \theta_{MAINM}(1)}{v\max_M}\right|\right)$$

The temporary times P(3) and P(4) can be obtained in a way similar to that described above. In this way, the temporary time P(N) is obtained for each main point N (each main joint vector N). Since the aforementioned expression (3) divides the angle difference between the main points by the maximum allowable speed, it indicates the time it takes for the robot to move between the main points at the highest speed within an allowable range. Further, in each joint, the longest temporary time of the joint is employed, and the other joints are synchronized with this joint.

The temporary time adjustment unit 9 adjusts the time axis of the spatial smoothing path in such a way as to satisfy the maximum allowable acceleration and the maximum jerk when the robot moves along the spatial smoothing path. That is, the temporary time adjustment unit 9 adjusts the temporary time of each of the main points in such a way as to satisfy the maximum allowable acceleration and the maximum jerk when the robot moves along the spatial smoothing path. The temporary time adjustment unit 9 also checks whether the spatial smoothing path interferes with the obstacle. When the spatial smoothing path interferes with the obstacle, the temporary time adjustment unit 9 adjusts the temporary time of each of the main points again.

Figure 5:
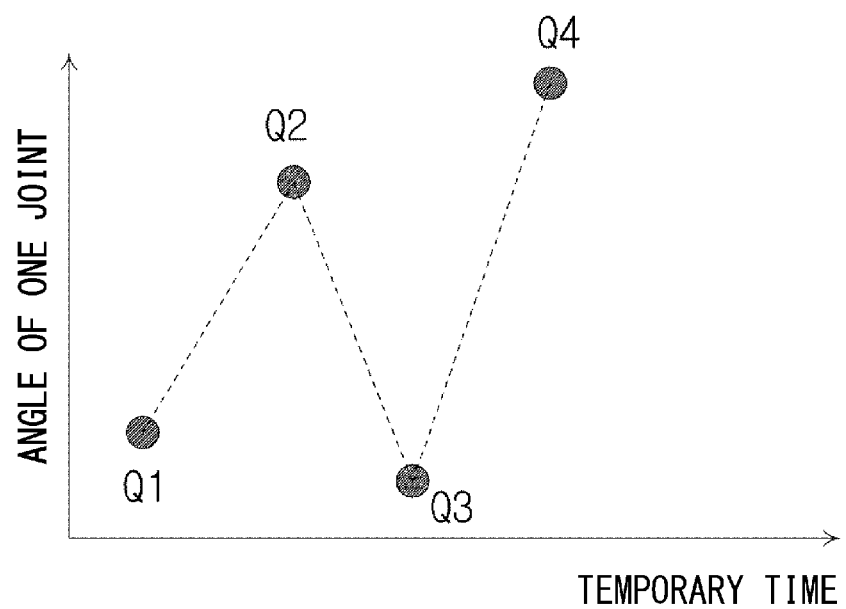
FIG. 5 is an explanatory diagram showing processing in a time adjustment unit.

FIG. 5, which is a graph showing the time-space path generated based on the temporary time P(N) in each of the main points that has been set by the temporary time setting unit 8, shows a relation between the angle of one joint and the temporary time. The horizontal axis indicates the temporary time and the vertical axis indicates the angle. Further, the main points in this joint are denoted by a main point Q1, a main point Q2, a main point Q3, and a main point Q4 in this order along the direction in which time passes. The graph shown in FIG. 5 satisfies the conditions regarding the maximum allowable speed since the temporary time P(N) has been set as described above. For example, the absolute value of the inclination of the line segment between the main point Q1 and the main point Q2 is equal to or smaller than the maximum allowable speed.

Figure 6:
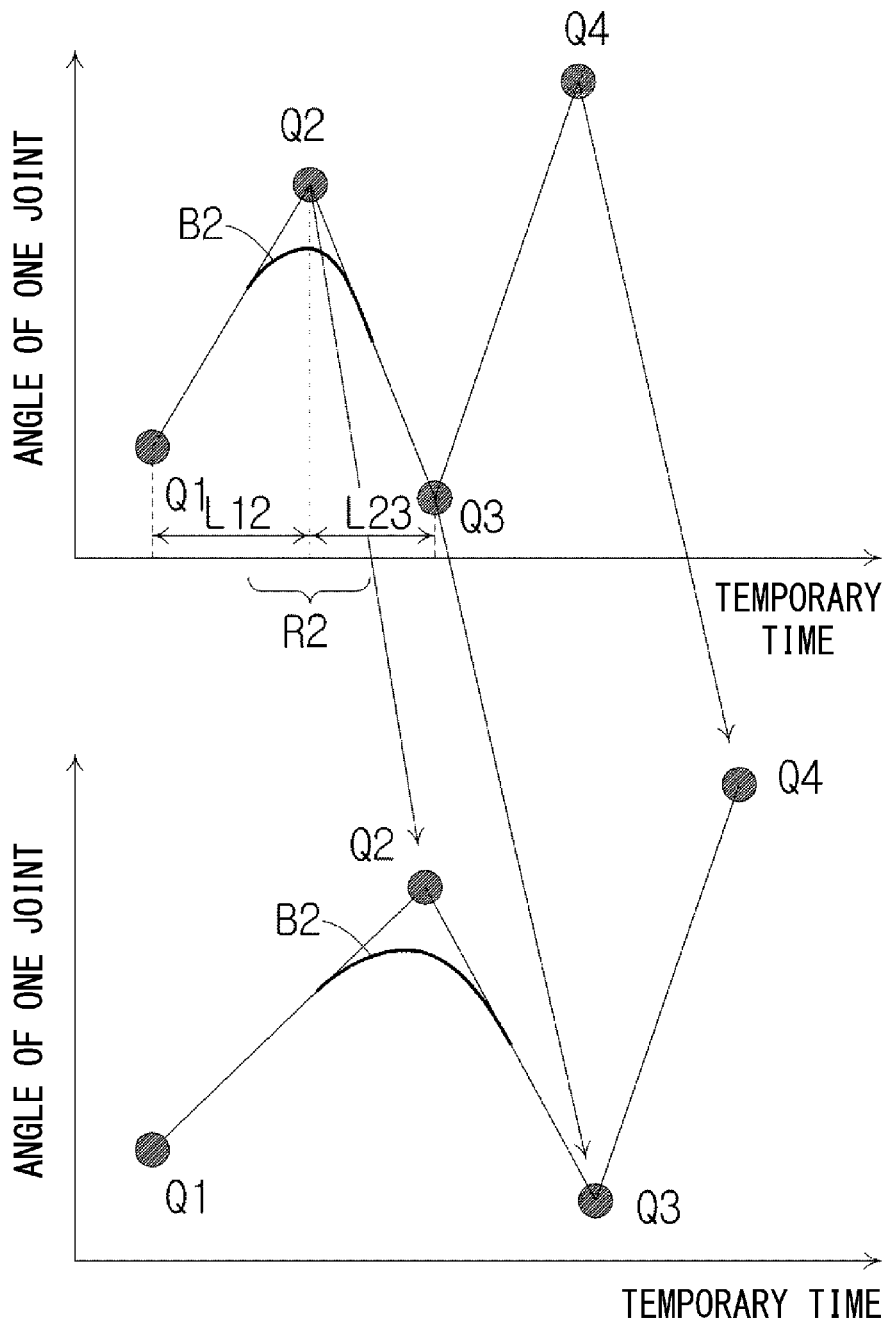
FIG. 6 is an explanatory diagram showing processing in the time adjustment unit.

Next, as shown in FIG. 6, the temporary time adjustment unit 9 prolongs the temporary time of the main points Q2-Q4 in order to satisfy the maximum acceleration condition in the main point Q2. Specifically, first, the time-space path is spatially smoothed using the mollifier function in the smoothing range R2.

Note that the smoothing range R2, which is a range on the temporary time axis, is a range that includes the main point Q2. Specifically, first, the difference L12 on the temporary time axis between the main point Q1 and the main point Q2 is compared with the difference L23 on the temporary time axis between the main point Q2 and the main point Q3. Then the difference of the differences L12 and L23 which is smaller than the other one is determined. In the example shown in FIG. 6, the difference L23 is smaller than the difference L12. Therefore, the reference for determining the smoothing range R2 is set to be the difference L23. The smoothing range R2 is a range from the timing at which the main point Q2 is deviated to the side of the main point Q3 by L23/2 to the timing at which the main point Q2 is deviated to the side of the main point Q1 by L23/2 on the temporary time axis.

Further, the mollifier function may be the aforementioned Ternary Polynomial function.

The curved path that is spatially smoothed in the main point Q2 is hereinafter denoted by a curved path B2.

Next, the temporary time setting unit 8 determines whether the operation speed exceeds the maximum allowable acceleration when the robot has moved along the curved path B2. When the result of the determination is YES, the temporary time of all the main points after the main point Q2 is sufficiently prolonged in such a way that the operation speed does not exceed the maximum allowable acceleration when the robot has moved along the curved path B2. Specifically, as shown in the lower diagram in FIG. 6, the temporary time of the main points Q2-Q4 is prolonged. Accordingly, the curved path B2 is extended along the temporary time axis, whereby the operation speed falls within the maximum allowable acceleration when the robot has moved along the curved path B2.

The acceleration in the curved path B2 can be easily obtained by differentiating the curved path B2 by time. Further, the jerk in the curved path B2 can be easily obtained by performing second-order differentiation on the curved path B2 with respect to time. Accordingly, it is determined whether the operation speed exceeds the jerk when the robot has moved along the curved path B2. When the result of the determination is YES, the temporary time of all the main points after the main point Q2 may be sufficiently prolonged in such a way that the operation speed does not exceed the jerk when the robot has moved along the curved path B2.

Figure 7:
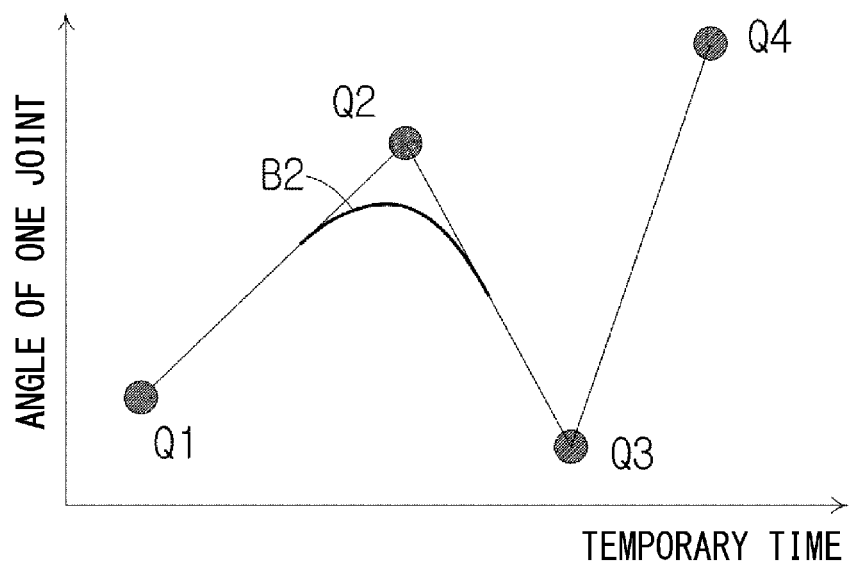
FIG. 7 is an explanatory diagram showing processing in the time adjustment unit.

FIG. 7 shows a time-space path in which the conditions regarding the maximum allowable acceleration are satisfied in the main point Q2. In the main point Q2, the time-space path has been spatially smoothed using the mollifier function. Therefore, when the robot moves along the curved path B2, it is possible that it may interfere with the obstacle. Therefore, the temporary time adjustment unit 9 determines whether the curved path B2 interferes with the obstacle. When the result of the determination is YES, the curved path B2 is discarded, smoothing in the main point Q2 is executed again by narrowing the range of the smoothing range R2 that has been used when the curved path B2 is generated. A method of narrowing the range of the smoothing range R2 may include, for example, but not limited to, setting a range from the timing at which the main point Q2 is deviated to the side of the main point Q3 by L23/4 to the timing at which the main point Q2 is deviated to the side of the main point Q1 by L23/4 on the temporary time axis to be the new smoothing range R2. By narrowing the smoothing range R2 as described above, the new curved path B2 passes closer to the main point Q2, whereby the aforementioned interference can be prevented.

It is possible, however, that the curved path B2, which is generated by narrowing the smoothing range R2, may exceed the maximum allowable acceleration since this curved path B2 is a sharp curve. Therefore, the temporary time adjustment unit 9 prolongs again, when the result of spatially smoothing the time-space path using the mollifier function in the new smoothing range R2 shows that the operation speed exceeds the maximum allowable acceleration in the new smoothing range R2, the temporary time of the main points after the main point Q2 in such a way that the operation speed does not exceed the maximum allowable acceleration in the new smoothing range R2. Since it has been confirmed that the interference has been canceled once, it can be said that there is substantially no need to newly determine the presence or absence of interference by this prolongation.

Figure 8:
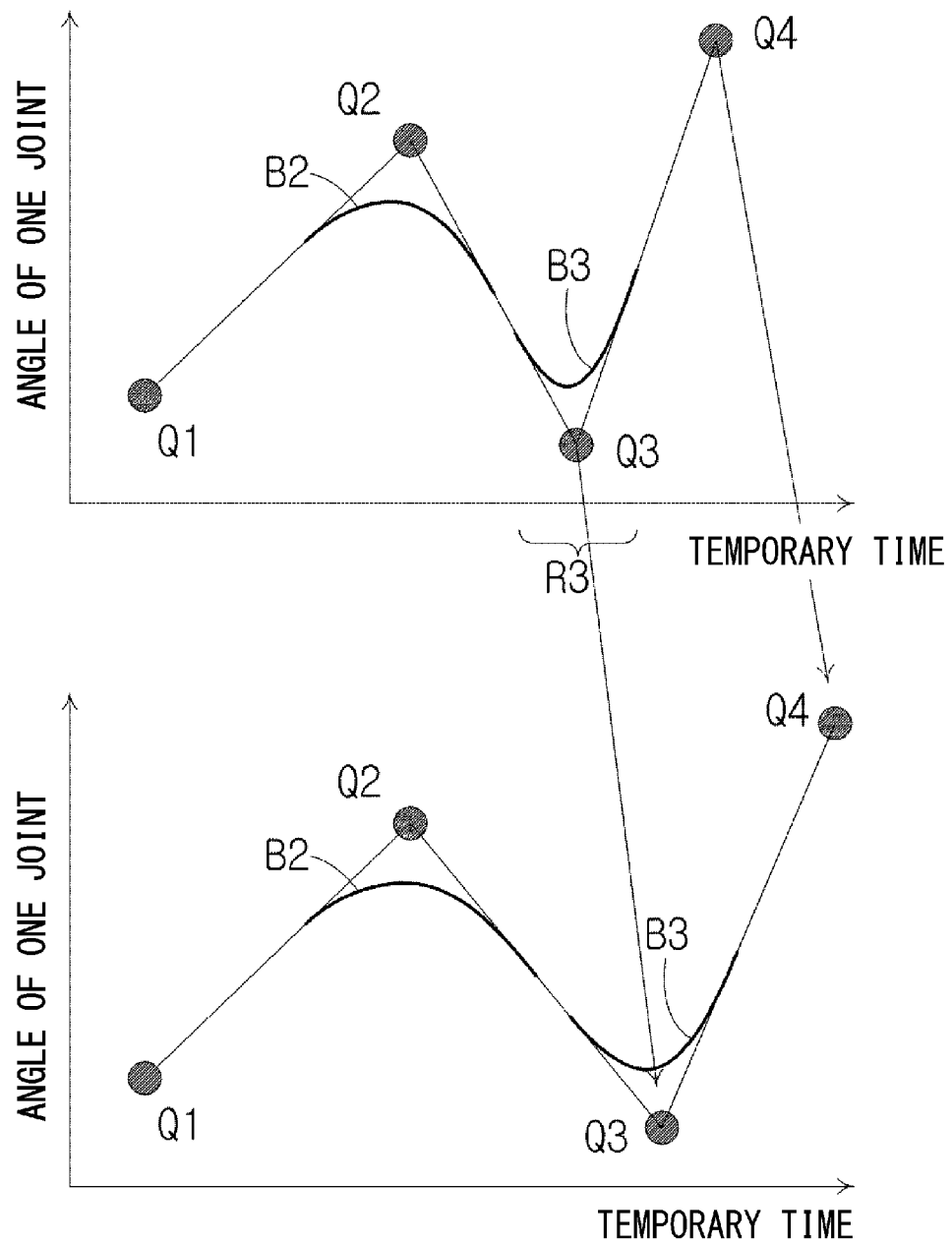
FIG. 8 is an explanatory diagram showing processing in the time adjustment unit.

Next, as shown in FIG. 8, the temporary time adjustment unit 9 prolongs the temporary time of the main points Q3 and Q4 in such a way as to satisfy the maximum acceleration condition in the main point Q3. Specifically, first, the temporary time adjustment unit 9 spatially smooths the time-space path in the smoothing range R3 using the mollifier function.

The smoothing range R3 is a range on the temporary time axis that includes the main point Q3. The method of determining the smoothing range R2 can be used as the method of determining the smoothing range R3. However, while the difference L23 is changed such that this difference increases when the maximum acceleration condition in the main point Q2 is satisfied, either the difference L23 after the increase or the difference L23 before the increase may be used when the difference L23 is compared with the difference L34. In order to simplify the calculation, the difference L23 before the increase may be used.

The curved path that has been spatially smoothed in the main point Q3 is hereinafter denoted by a curved path B3.

Next, the temporary time setting unit 8 determines whether the operation speed exceeds the maximum allowable acceleration when the robot has moved along the curved path B3. When the result of the determination is YES, the temporary time setting unit 8 sufficiently prolongs the temporary time of all the main points after the main point Q3 in such a way that the operation speed does not exceed the maximum allowable acceleration when the robot has moved along the curved path B3. Specifically, as shown in the lower diagram of FIG. 8, the temporary time of the main points Q3 and Q4 is prolonged. Accordingly, the curved path B3 is extended along the temporary time axis, whereby the operation speed falls within the maximum allowable acceleration when the robot has moved along the curved path B3.

Further, in a way similar to that described above, it is determined whether the operation speed exceeds the jerk when the robot has moved along the curved path B3. When the result of the determination is YES, the temporary time of all the main points after the main point Q3 may be sufficiently prolonged in such a way that the operation speed does not exceed the jerk when the robot has moved along the curved path B3.

Figure 9:
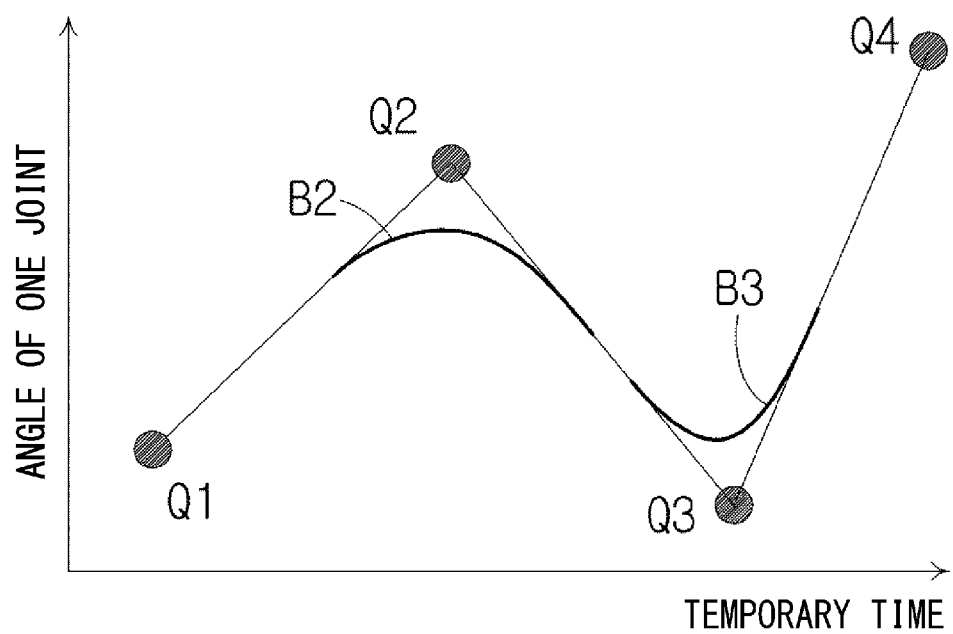
FIG. 9 is an explanatory diagram showing processing in the time adjustment unit.

FIG. 9 shows a time-space path in which the conditions regarding the maximum allowable acceleration are satisfied in the main point Q3. In a way similar to that described above, the temporary time adjustment unit 9 determines whether the curved path B3 interferes with the obstacle. When the result of the determination is YES, the curved path B3 is discarded, and smoothing in the main point Q3 is executed again by narrowing the range of the smoothing range R3 used when the curved path B3 is generated. Further, when the result of spatially smoothing the time-space path using the mollifier function in the new smoothing range R3 shows that the operation speed exceeds the maximum allowable acceleration in the new smoothing range R3, the temporary time adjustment unit 9 prolongs the temporary time of the main points after the main point Q3 again in such a way that the operation speed does not exceed the maximum allowable acceleration in the new smoothing range R3. Since it has been confirmed that the interference has been canceled once, it can be said that there is substantially no need to newly determine the presence or absence of interference by this prolongation.

In this way, the temporary time setting unit 8 sets the temporary time, whereby the conditions regarding the maximum allowable speed for the spatial smoothing path are satisfied. Further, the temporary time adjustment unit 9 adjusts the temporary time, whereby the conditions regarding the maximum allowable acceleration and the interference for the time-space path are satisfied. In this way, the time determination unit 5 determines the speed profile on the time axis of the spatial smoothing path, thereby generating the time-space path of the robot in which the conditions regarding the maximum allowable speed and the maximum allowable acceleration are satisfied without interference with the obstacle.

Figure 10:
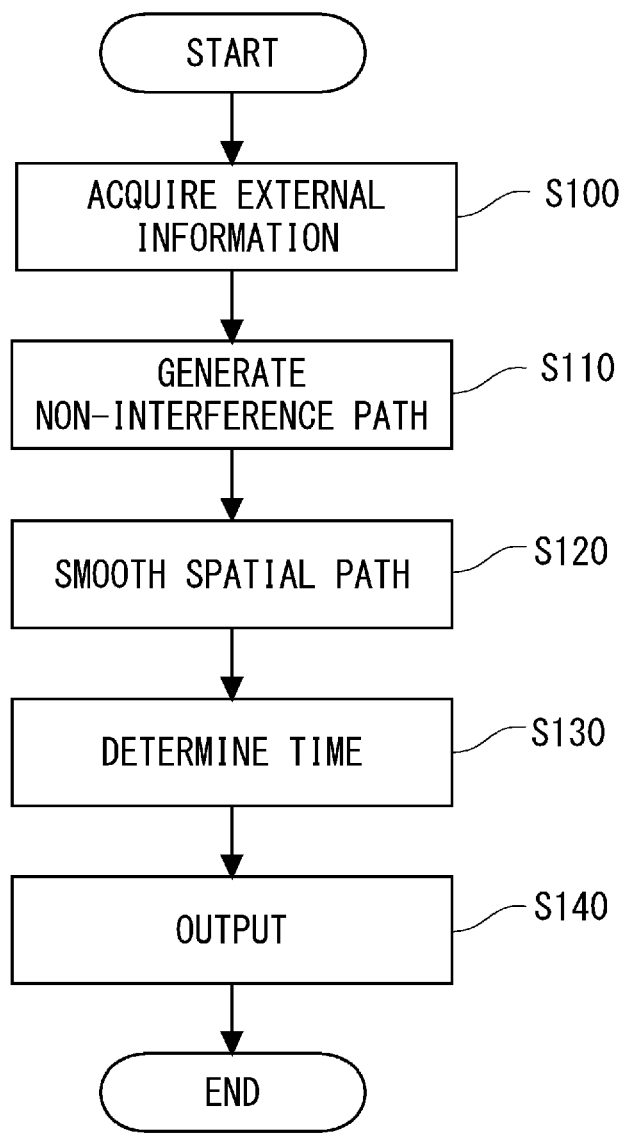
FIG. 10 is a control flow of an operation planning apparatus.
Figure 11:
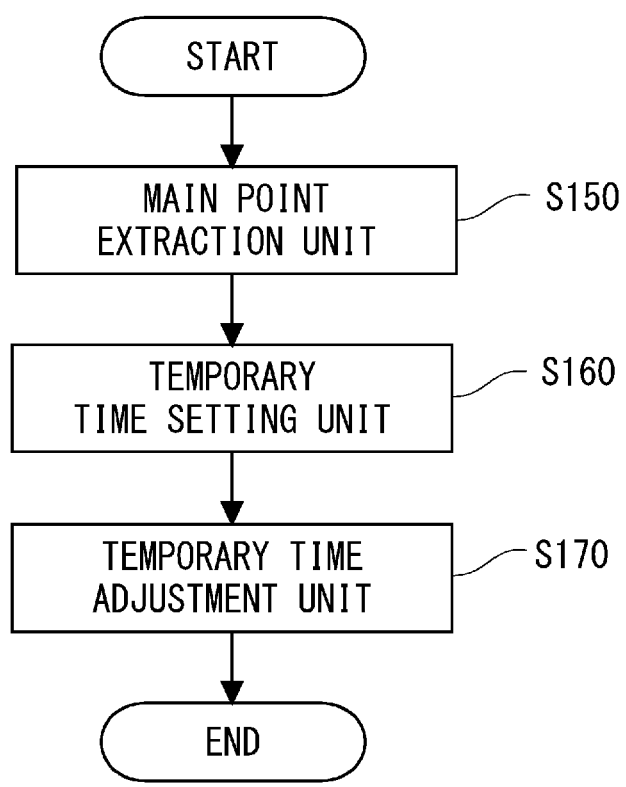
FIG. 11 is a control flow of a time determination unit.

With reference Next to FIGS. 10 and 11, a control flow of the operation planning apparatus 1 will be explained.

First, the external information acquisition unit 2 acquires the external information (S100).

Next, the non-interference path generation unit 3 generates the non-interference path in which the robot 100 does not interfere with the obstacle between the start point and the end point set in advance (S110).

Next, the spatial smoothing path generation unit 4 generates the spatial smoothing path in which the non-interference path is spatially smoothed (S120).

Next, the time determination unit 5 determines the time at which the plurality of main points included in the spatial smoothing path are passed, thereby generating the time-space path, which is the path in time-space (S130).

Next, the output unit 6 outputs the time-space path generated by the time determination unit 5 (S140).

As shown in FIG. 11, in the time determination step (S130), the following flow is further executed.

First, the main point extraction unit 7 extracts the main point from the spatial smoothing path (S150).

Next, the temporary time setting unit 8 sets, for each main point, the temporary time, which is time that elapses from the start point to each of the main points, in such a way that the operation speed does not exceed the maximum allowable speed between the plurality of main points (S160).

Next, the temporary time adjustment unit 9 spatially smooths the spatial smoothing path using the mollifier function in the smoothing range R2 (first smoothing range) including the main point. When the operation speed exceeds the maximum allowable acceleration in the smoothing range R2, the temporary time adjustment unit 9 prolongs the temporary time of the plurality of main points after the main point in such a way that the operation speed does not exceed the maximum allowable acceleration in the smoothing range R2 (S170).

While the suitable embodiments of the present disclosure have been described above, the aforementioned embodiments have the following features.

That is, the operation planning apparatus 1 of the robot 100 includes the non-interference path generation unit 3 configured to generate the non-interference path in which the robot does not interfere with the obstacle between the start point and the end point set in advance, the spatial smoothing path generation unit 4 configured to generate the spatial smoothing path in which the non-interference path is spatially smoothed, and the time determination unit 5 configured to determine the time at which the plurality of main points included in the spatial smoothing path are passed, thereby generating the time-space path, which is a path in time-space. The plurality of main points include the start point of the spatial smoothing path, the end point of the spatial smoothing path, and the midpoint between the start point of the spatial smoothing path and the end point of the spatial smoothing path. The time determination unit 5 includes the temporary time setting unit 8 configured to set, for each main point, temporary time, which is time that elapses from the start point to each of the main points in such a way that the operation speed does not exceed the maximum allowable speed between the plurality of main points, and the temporary time adjustment unit 9 configured to spatially smooth the spatial smoothing path using the mollifier function in the first smoothing range (e.g., smoothing range R2) that includes the main point, and prolongs, if the operation speed exceeds the maximum allowable acceleration in the first smoothing range, the temporary time of the plurality of main points after the main point in such a way that the operation speed does not exceed the maximum allowable acceleration in the first smoothing range. According to the aforementioned configuration, the operation plan of the robot in which the conditions regarding the maximum allowable speed and the maximum allowable acceleration are satisfied can be obtained without interference with the obstacle by a simple calculation.

When the result of spatially smoothing the spatial smoothing path using the mollifier function in the smoothing range R2 shows that the spatial smoothing path interferes with the obstacle, the temporary time adjustment unit 9 spatially smooths the spatial smoothing path using the mollifier function in the new smoothing range R2 (second smoothing range) that includes a main point and is narrower than the smoothing range R2. According to the aforementioned configuration, the interference of the spatial smoothing path with the obstacle can be prevented.

Further, when the result of spatially smoothing the spatial smoothing path using the mollifier function in the new smoothing range R2 shows that the operation speed exceeds the maximum allowable acceleration in the new smoothing range R2, the temporary time adjustment unit 9 prolongs the temporary time of the plurality of main points after the main point again in such a way that the operation speed does not exceed the maximum allowable acceleration in the new smoothing range R2. According to the aforementioned configuration, the operation plan of the robot in which the conditions regarding the maximum allowable speed and the maximum allowable acceleration are satisfied can be definitely obtained without interference with the obstacle by a simple calculation.

As shown in FIG. 4, the midpoint which may be the main point may be the passing point of the passing points on the spatial smoothing path at which the inclination with respect to the distance of the spatial smoothing path has been changed by a predetermined amount or more before and after the passing point.

Further, the robot 100 is an articulated robot that includes a plurality of joints. The temporary time is synchronized between the plurality of joints.

In the aforementioned embodiments, the robot 100 may be, for example, formed as a single-arm robot that includes one arm part 103 or may be an arm-type robot that includes only the arm part 103. Further, the robot 100 may be a moving body such as an autonomous vehicle.

Figure 12:
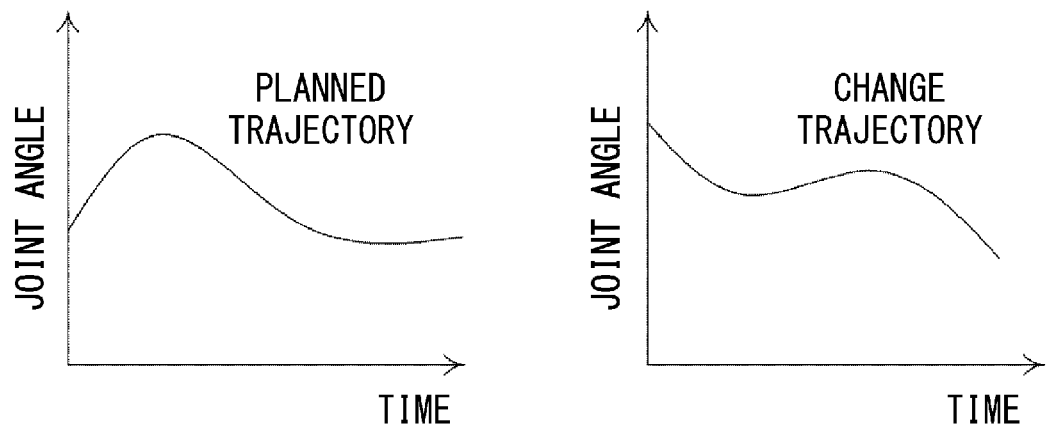
FIG. 12 is a diagram illustrating a method of connecting a time-space path when a planned trajectory has been changed to a change trajectory during an operation.

Next, as shown in FIG. 12, a case in which the robot changes the motion trajectory from a planned trajectory to a change trajectory during the operation and the speed at the start point or the end point is not zero will be considered. In the following description, a method of spatial smoothing and time smoothing including the start point of the change trajectory in the case in which the speed at the start point of the change trajectory is not zero will be explained.

Figure 13:
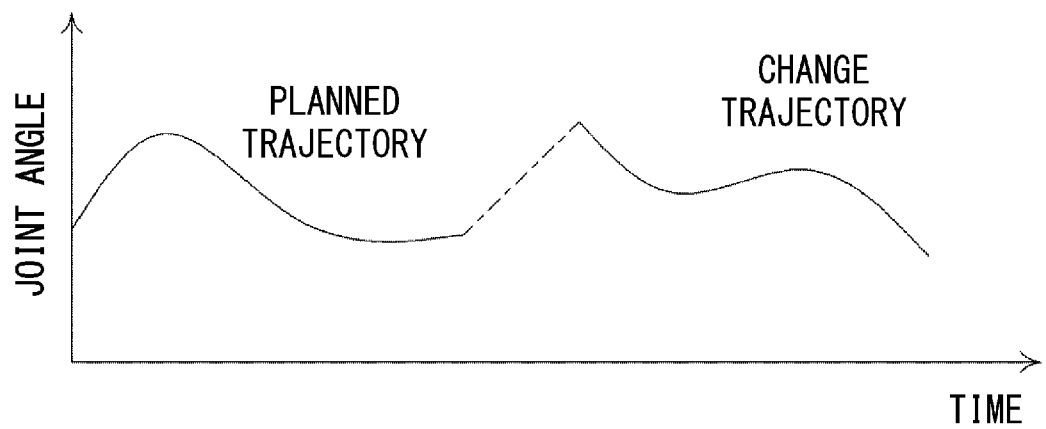
FIG. 13 is a diagram illustrating a method of connecting a time-space path when a planned trajectory has been changed to a change trajectory during an operation.
Figure 14:
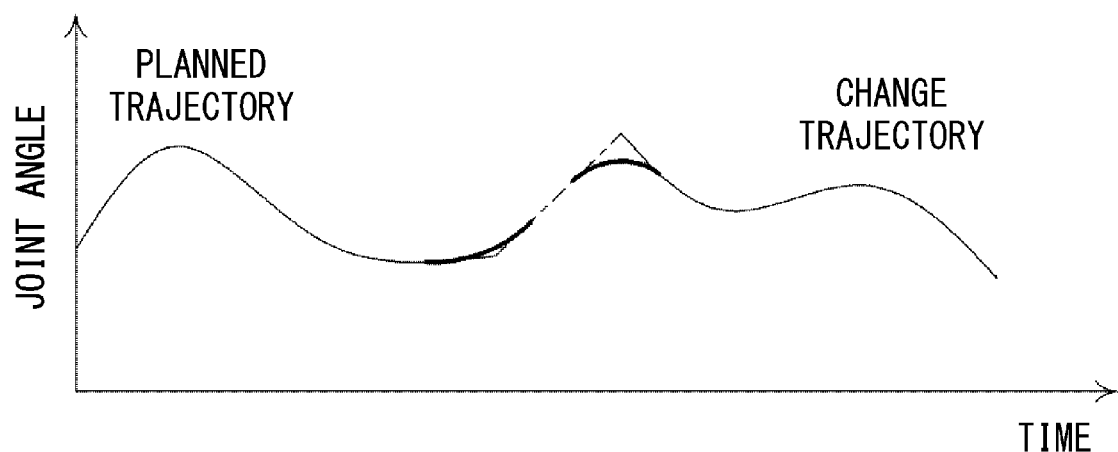
FIG. 14 is a diagram illustrating a method of connecting a time-space path when a planned trajectory has been changed to a change trajectory during an operation.

First, in order to connect the end point of the planned trajectory and the start point of the change trajectory shown in FIG. 12, as shown by the alternate long and two short dashes line in FIG. 13, the end point of the planned trajectory and the start point of the change trajectory are linearly interpolated in the range in which the operation speed does not exceed the maximum allowable speed.

Next, as shown in FIG. 13, the trajectory is smoothed in such a way that the operation speed does not exceed the maximum acceleration at the point at which the linearly-interpolated line segment and the planned trajectory are connected to each other. In a similar way, the trajectory is smoothed in such a way that the operation speed does not exceed the maximum acceleration at the point at which the linearly-interpolated line segment and the change trajectory are connected to each other. According to the aforementioned method, two curved trajectories are generated, whereby it becomes possible to connect the planned trajectory and the change trajectory spatially smoothly while satisfying the conditions regarding the maximum allowable speed and the maximum allowable acceleration.

A (The) program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An operation planning apparatus of a robot, the apparatus comprising:
   a non-interference path generation unit configured to generate a non-interference path in which the robot does not interfere with an obstacle between a start point and an end point set in advance;
   a spatial smoothing path generation unit configured to generate a spatial smoothing path in which the non-interference path is spatially smoothed; and
   a time determination unit configured to determine time at which a plurality of main points included in the spatial smoothing path are passed, thereby generating a time-space path, which is a path in time-space, wherein
   the plurality of main points include a start point of the spatial smoothing path, an end point of the spatial smoothing path, and a midpoint between the start point of the spatial smoothing path and the end point of the spatial smoothing path, and
   the time determination unit comprises:
      a temporary time setting unit configured to set, for each main point, temporary time, which is time that elapses from the start point to each of the main points, in such a way that an operation speed does not exceed a maximum allowable speed between the plurality of main points; and
      a temporary time adjustment unit configured to spatially smooth the spatial smoothing path in a first smoothing range that includes a main point of the main points using a mollifier function, and prolong, if an operation acceleration exceeds a maximum allowable acceleration in the first smoothing range, the temporary time of only the main point and main points after the main point in such a way that the operation acceleration does not exceed the maximum allowable acceleration in the first smoothing range.

2. The operation planning apparatus according to claim 1, wherein the temporary time adjustment unit spatially smooths, when a result of spatially smoothing the spatial smoothing path using the mollifier function in the first smoothing range shows that the spatial smoothing path interferes with the obstacle, the spatial smoothing path using the mollifier function in a second smoothing range, which is a range that includes the main point and is narrower than the first smoothing range.

3. The operation planning apparatus according to claim 2, wherein the temporary time adjustment unit prolongs, when a result of spatially smoothing the spatial smoothing path using the mollifier function in the second smoothing range shows that the operation acceleration exceeds the maximum allowable acceleration in the second smoothing range, the temporary time of the plurality of main points after the main point again in such a way that the operation acceleration does not exceed the maximum allowable acceleration in the second smoothing range.

4. The operation planning apparatus according to claim 1, wherein the midpoint is a passing point of passing points on the spatial smoothing path at which an inclination with respect to a distance of the spatial smoothing path has been changed by a predetermined amount or more before and after the passing point.

5. The operation planning apparatus according to claim 1, wherein
   the robot is an articulated robot that includes a plurality of joints, and
   the temporary time is synchronized between the plurality of joints.

6. An operation planning method of a robot, the method comprising:
   a non-interference path generation step for generating a non-interference path in which the robot does not interfere with an obstacle between a start point and an end point set in advance;
   a spatial smoothing path generation step for generating a spatial smoothing path in which the non-interference path is spatially smoothed; and
   a time determination step for determining time at which a plurality of main points included in the spatial smoothing path are passed, thereby generating a time-space path, which is a path in time-space, wherein
   the plurality of main points include a start point of the spatial smoothing path, an end point of the spatial smoothing path, and a midpoint between the start point of the spatial smoothing path and the end point of the spatial smoothing path, and the time determination step comprises:
- a temporary time setting step for setting, for each main point, temporary time, which is time that elapses from the start point to each of the main points, in such a way that an operation speed does not exceed a maximum allowable speed between the plurality of main points; and
- a temporary time adjustment step for spatially smoothing the spatial smoothing path in a first smoothing range that includes a main point of the main points using a mollifier function, and prolonging, when an operation acceleration exceeds a maximum allowable acceleration in the first smoothing range, the temporary time of only the main point and main points after the main point in such a way that the operation acceleration does not exceed the maximum allowable acceleration in the first smoothing range.

* * * * *